United States Patent [19]

Karni et al.

[11] Patent Number: 5,323,764
[45] Date of Patent: Jun. 28, 1994

[54] CENTRAL SOLAR RECEIVER

[75] Inventors: Jacob Karni; Avi Kribus, both of Rehovot, Israel

[73] Assignee: Yeda Research and Development Company Limited, Rehovot, Israel

[21] Appl. No.: 5,383

[22] Filed: Jan. 15, 1993

[30] Foreign Application Priority Data

Jan. 23, 1992 [IL] Israel ................................. 100743

[51] Int. Cl.$^5$ ............................................. F24J 3/02
[52] U.S. Cl. ................................... 126/680; 126/681; 126/689; 126/690
[58] Field of Search ............... 126/680, 690, 681, 689, 126/569, 704, 698, 699, 692, 683, 684

[56] References Cited

U.S. PATENT DOCUMENTS

| | | | |
|---|---|---|---|
| 4,018,212 | 4/1977 | Hein et al. | 126/681 |
| 4,044,753 | 8/1977 | Fletcher | 126/680 X |
| 4,394,859 | 7/1983 | Drost | 126/680 X |
| 4,402,306 | 9/1983 | McElroy et al. | 126/689 |
| 4,452,232 | 6/1984 | David | 126/680 |
| 4,462,391 | 7/1984 | Laussermair et al. | 126/680 X |
| 4,475,538 | 10/1984 | Percival et al. | 126/680 X |
| 5,245,986 | 9/1993 | Karni | 126/680 |

Primary Examiner—Larry Jones
Attorney, Agent, or Firm—Oliff & Berridge

[57] ABSTRACT

A central solar receiver comprising a housing with a window for the admission of incident concentrated solar radiation, a volumetric solar absorber within the housing comprising a base body holding an array of absorber members spaced from each other and projecting from one face thereof with their free ends facing said window, means for the injection of working fluid into the volumetric solar absorber in flow directions which intersect the absorber members and means for the withdrawal of heated working fluid. The window of the central solar receiver is a tubular frusto-conical body coaxial with the housing, whereby the receiver is adapted for operation at elevated pressure.

4 Claims, 3 Drawing Sheets

CENTRAL SOLAR RECEIVER

GLOSSARY

Some of the terms that will be used in the following description and claims have the following meaning:

Solar absorber—a body or construct capable of absorbing and converting into heat impinging solar radiation.

Working fluid—a fluid flowing in contact with a solar absorber and taking up heat therefrom by indirect or direct heat exchange. The working fluid may serve as heat carrier for removal of the heat generated in the solar absorber. In addition or alternatively it may consist of a mixture of two or more components which, upon contact with the hot solar absorber, are induced to react with each other, i.e. to perform a so-called thermochemical process.

Central solar receiver—a device with a chamber comprising a solar absorber and means for the circulation of a working fluid in indirect or direct heat exchange relationship therewith; so called because in operation it is mounted in the center, i.e. the focal region of a solar radiation concentrator.

Volumetric solar absorber—a solar absorber fabricated in form of a three-dimensional matrix enabling the throughflow of a working fluid in direct heat exchange relationship therewith.

Receiver's window—a transparent section of the receiver's wall, which allows highly concentrated sunlight to enter the receiver's chamber, while preventing the pressurized working fluid from escaping.

FIELD AND BACKGROUND OF THE INVENTION

The invention relates to central solar receivers with volumetric solar absorber.

A central solar receiver absorbs concentrated sunlight at a high temperature, commonly about 700°–1300° C. and transfers the heat from the solar absorber therein to a working fluid which either serves as heat carrier fluid or else is designed to perform a heat induced, possibly catalyzed, endothermic chemical reaction between components of the working fluid. For various industrial applications such as the operation of gas turbines for electricity generation or the performance of endothermic reactions of the kind specified, it is necessary that the working fluid circulates through the system at an elevated pressure of say 10–30 atmospheres. At such a pressure the density of the circulating gaseous working fluid is much higher than in the unpressurized state and consequently pressure losses during circulation are lower.

A directly irradiated central solar receiver with volumetric absorber comprises a housing having a window for the admission of incident concentrated solar radiation and one of the most critical problems associated with pressurized central solar receivers is the mechanical strength of the receiver's window. Materials that have the required optical and thermal properties tend to be brittle, which means that while they can withstand large compression stresses they tend to crack or shatter under even relatively small tension stresses. Stresses in the window are created by the gas pressure in the interior of the receiver and also by uneven thermal expansion of the window and other receiver components as they heat up during operation. Non-uniform stresses exist, as a rule, at different points in any window of a central solar receiver and consequently hitherto central solar receivers could not be operated at elevated pressures.

In IL 97091 and the corresponding U.S. Ser. No. 07/820,418, U.S. Pat. No. 5,245,986 issued Sep. 23, 1993, EP 495395 A1 and patent applications in other jurisdictions, there is described an improved central solar receiver comprising a housing with a window for the admission of incident concentrated solar radiation accommodating a volumetric solar absorber having a base body with an array of absorber members spaced from each other and projecting from one face thereof with their free ends facing the window, the working fluid being injected into the volumetric solar absorber in a flow which intersects the absorber members.

It is the object of the present invention to provide a central solar receiver based on the teachings of our IL 97091 and designed for operation at elevated pressure.

It is a further object of the present invention to provide a window unit adapted for incorporation in the housing of a central solar receiver operating at elevated pressure.

It is yet another object of the present invention to provide a volumetric solar absorber for incorporation in a central solar receiver of the kind specified operating at elevated pressure.

SUMMARY OF THE INVENTION

In accordance with the invention there is provided a central solar receiver comprising a tubular housing with a window for the admission of incident concentrated radiation, a volumetric solar absorber within the housing comprising a base body holding an array of absorber members spaced from each other and projecting from one face thereof with their free ends facing said window, means for the injection of working fluid into the volumetric solar absorber in flow directions which intersect the absorber members and means for the withdrawal of heated working fluid, characterized by said tubular volumetric solar being an axi-symmetric tubular body in which said absorber members project towards the axis, which tubular volumetric absorber is coaxial with said tubular housing and has a radiation admitting aperture; and by said window being an axi-symmetric tubular frusto-conical body coaxial with and surrounded by said volumetric solar absorber; whereby the central solar receiver is adapted for operation under elevated pressure.

Due to the frusto-conical shape of the window any pressure acting thereon from within the housing of the central solar receiver according to the invention produces compression stress components which the window can intrinsically withstand.

Preferably, the frusto-conical window comprises at both ends cylindrical rim portions by which it can be set and held.

If desired, the frusto-conical window in a central solar receiver according to the invention may be of the double pane type.

In a central solar receiver according to the invention, the tubular frusto-conical window has large-diameter and small-diameter end portions. Of these, the former forms the radiation admitting aperture and is located within a matching opening in one of the end walls of the housing and the latter is thus rear of the window. Preferably the rear of the window is connected to the receiver's housing by means of a bellows which absorbs any movements of the window relative to the housing without creating additional steam on the window.

In accordance with one embodiment of the invention, reflector means are provided near the inner small diameter end portion of the tubular frusto-conical window adapted to reflect into the solar receiver any incident concentrated solar radiation that has not penetrated through the window.

The axi-symmetric tubular volumetric solar absorber in a central solar receiver according to the invention may be of any suitable shape such as polyhedral-prismatic, cylindrical, frusto-conical, paraboidal, ellipsoidal, etc.

In a preferred embodiment of a central solar receiver according to the invention, means are provided for sweeping the inner face of said window with pressurized working fluid whereby the window is cooled.

It is further preferred to provide means for sweeping the outer face of said window with ambient air whereby the window is cleaned and further cooled.

The invention further provides for use in a central solar receiver of the kind specified, an axi-symmetrical tubular volumetric absorber body fitted with absorber members projecting from the inner face thereof.

Still further, the invention further provides for incorporation into the body of a central solar receiver, an axi-symmetric tubular frusto-conical transparent body suitable for forming a window thereof. Preferably the said tubular frusto-conical transparent body comprises at both ends cylindrical rim portions. The window in a central solar absorber according to the invention is made of conventional materials with the desired optical and thermal properties such as, for example, fused quartz.

DESCRIPTION OF THE DRAWINGS

For better understanding, a specific embodiment of the invention will now be described, by way of example only, with reference to the annexed drawings in which.

DESCRIPTION OF A SPECIFIC EMBODIMENT

Figure 1:
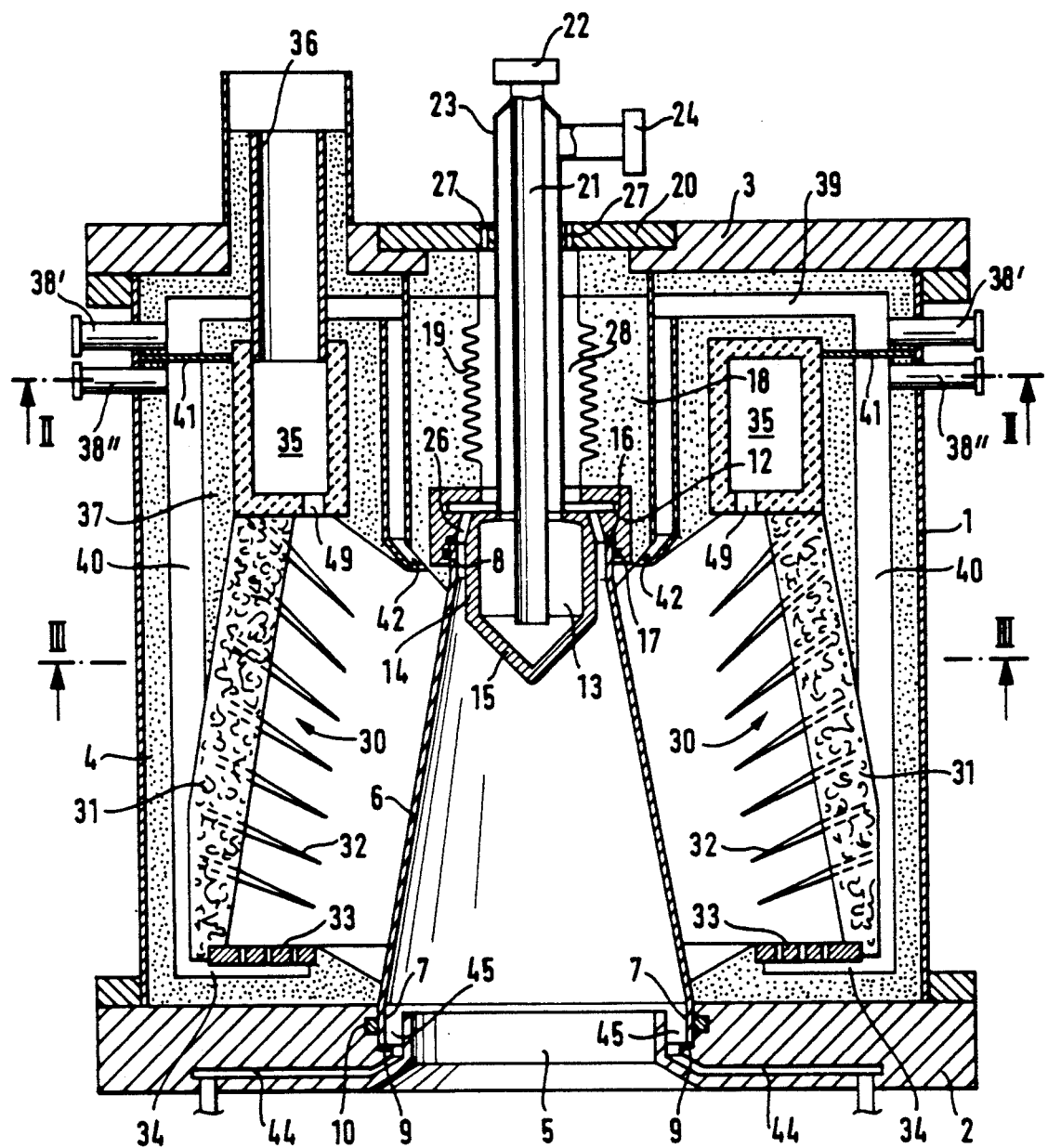
FIG. 1 is an axial section of a central solar receiver according to the invention.
Figure 2:
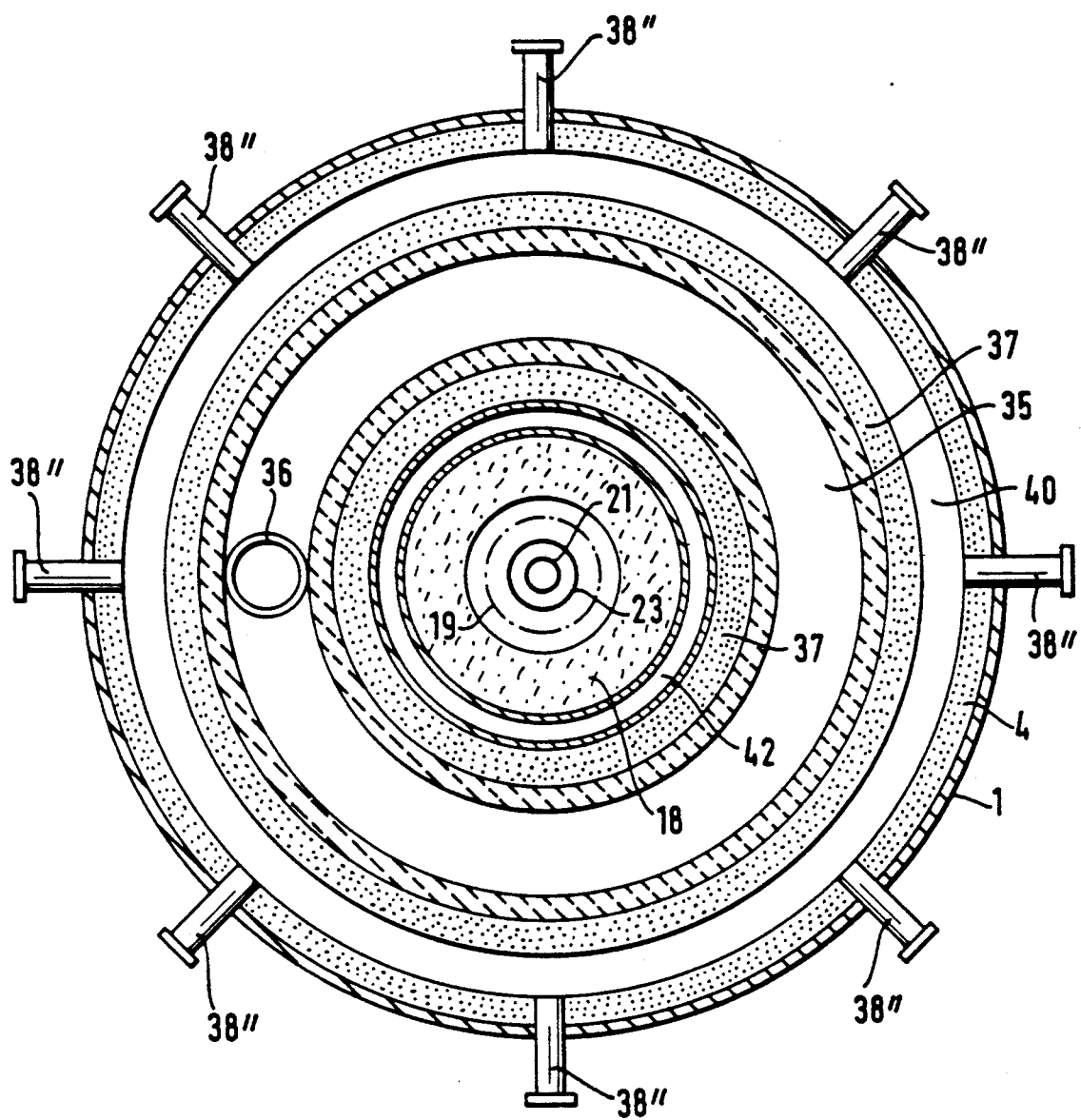
FIG. 2 is a section along line II—II of FIG. 1.
Figure 3:
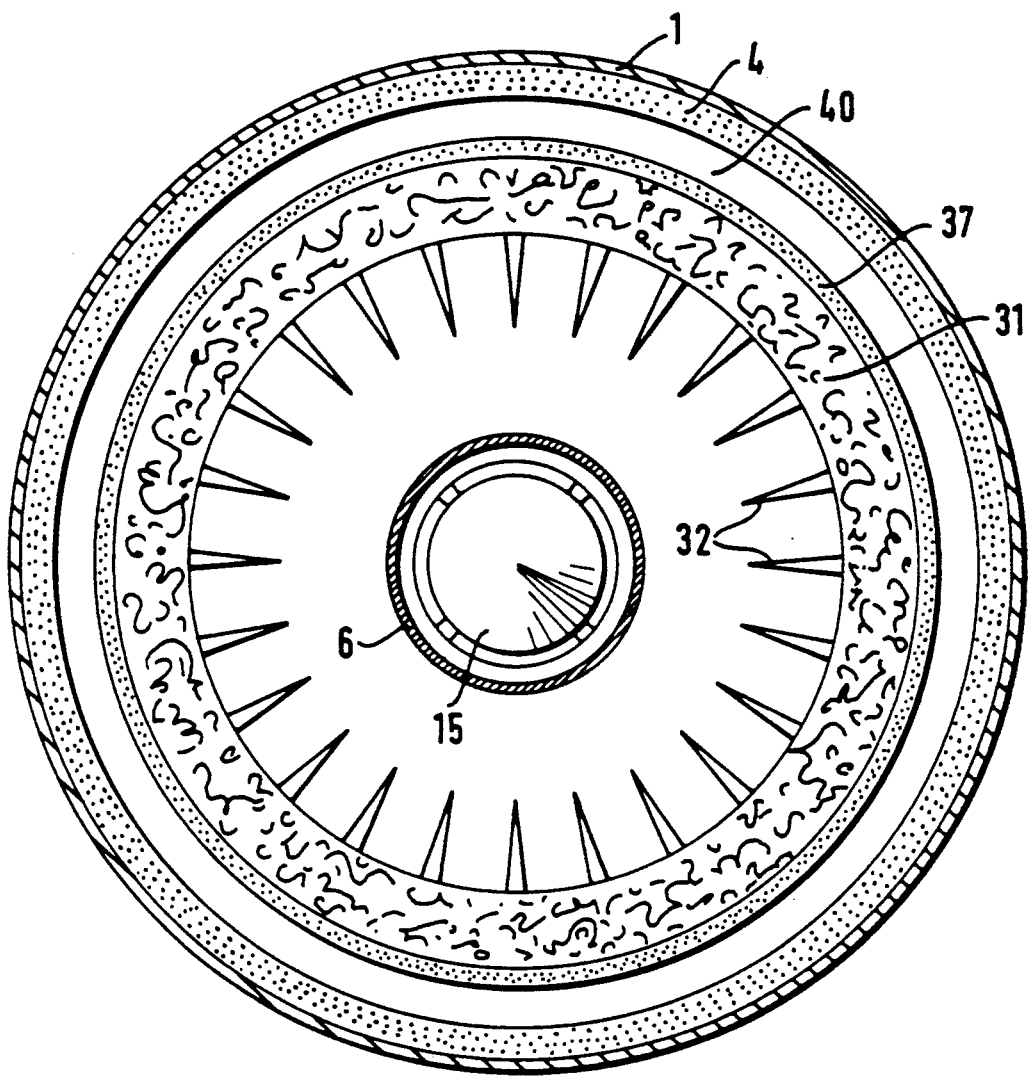
FIG. 3 is a section along line III—III of FIG. 1.

The central solar receiver according to the invention here shown comprises a metal housing 1 with front and rear end walls 2 and 3 and lined from within by an insulation layer 4. Through the central circular hole 5 of the front end wall 2 there is inserted a tubular frusto-conical window 6 suitable for the admission of solar radiation and for withstanding high temperatures. Near its large diameter end window 6 comprises a cylindrical 7 and near its small diameter end the window comprises a cylindrical rim 8. The setting of window 6 by means of its rim 7 in the front end wall 2 comprises a seal 9 held within a suitably shaped annular groove in end wall 2 and a positioning O-ring 10.

Near the narrow end portion of window 6 there is located a metal block 12, e.g. of aluminum, having a hollow portion 13 comprising a cylindrical part 14 and a highly polished, reflector part 15. The setting of window 6 by means of its rim portion 8 in block 12 comprises a seal 16 held within a suitably shaped annular groove in the block, and a positioning O-ring 17.

Block 12 is held within an insulation sleeve 18 and is connected to one end of a bellows 19 whose opposite end bears on a central sealing plate 20 of the rear end wall 3. A tube 21 with connector 22 and a coaxial sleeve 23 with a connector 24 serves, respectively, for the ingress of cooling water into the interior of the hollow portion 13 of block 12 and the egress of the cooling water therefrom whereby the reflector portion 15 of block 12 is cooled.

Block 12 comprises a plurality of air passage bores 26 and sealing plate 20 comprises a plurality of air passage bores 27 providing together with a cylindrical duct 28 surrounding sleeve 23 a passage for airflow from the inner space of window 6 to the rear of housing 1.

Inside housing 1 there is mounted a volumetric solar absorber 30 comprising a frusto-conically shaped base body 31 holding an array of spike-shaped absorber members 32 projecting from the inner surface thereof, both the base body 31 and the absorber member 32 being made of a suitable heat-resisting material such as ceramic material, a ceramic-coated metal alloy, silicone carbide, alumina, a special type stainless-steel, a nickel alloy or the like. Where the central solar absorber 30 serves for performing a heat induced endothermal chemical reaction between components of the working fluid, the absorber members 32 may be coated with a suitable catalyst.

Near its large diameter end portion the volumetric solar absorber 30 is fitted with a perforated metal ring 33 serving for the injection of working fluid from an annular duct 34 into the absorber so as to intersect the absorber members 32.

To the back of the volumetric solar absorber 30, and bearing on the small diameter end thereof, there is provided an annular chamber 35 fitted with inlets 49 and a tubular vent 36 and surrounded by a layer of insulating material 37 which also extends to the outer rear portion of the volumetric solar absorber 30.

In a region near to the rear end wall 3, housing 1 is fitted with a plurality of pairs of axial inlet pipes 38', 38" linked to a circular manifold (not shown) of which each pipe 38' opens into a rear, annular/cylindrical duct 39 and each pipe 38" opens into a cylindrical duct 40 which leads to the annular duct 34. Ducts 39 and 40 are separated by an annular partition 41 whereby working fluid injected via pipes 38' and 38" is conducted separately to an annular nozzle 42 directed towards the rear portion of window 6 and to the annular duct 34 from which it is injected via injector 33 into the volumetric solar absorber 30.

If desired, the annular duct 40 may be subdivided by axially oriented insulating partitions into two or more separate ducts each in form of a tubular segment and each being fitted with a separate inlet pipe. Alternatively the annular duct may be subdivided by means of a spirally shaped partition into a number of annular ducts. In either way it is possible to produce non-uniform fluid injection which may become desirable under certain thermal conditions in the receiver.

The front end wall 2 comprises a plurality of ducts 44 connected to air pumping means (not shown) and opening into an annular groove 45 whereby air is injected into the cavity of mirror 6 and flows along the outer surface thereof to be discharged via bores 26, duct 28 and bores 27.

The operation of the central solar receiver according to the invention is as follows:

Concentrated solar radiation is admitted via the aperture formed by the large diameter end of the tubular frusto-conical window 6. Some of the incident solar radiation penetrates directly through the window and impinges on the absorber members 32 of the volumetric solar absorber 30. Nearly all the incident solar radiation that does not penetrate across window 6 impinges the reflector portion 15 of body 12 and is reflected therefrom across window 6 on to the solar absorber 30. The combined incident solar radiation heats up the volumetric solar absorber 30.

Pressurized working fluid is injected into the receiver via the plurality of pairs of pipes 38', 38" from the manifold to which they are connected. The part of the injected working fluid that arrives via pipes 38" is conducted through ducts 40 and 34 and is injected to the volumetric solar absorber 30 via injector 33 with the flow direction being such that the injected working fluid intersects the absorber members 32.

The pressurized working fluid injected via pipe 38' is ejected via the annular nozzle 42 and flows along the inner face of window 6 whereby the window is cooled, and then mixes with the working fluid injected via the annular injector unit 33. After having travelled across the array of absorber members 32 the working fluid which, as the case may be, is either simply heated up or else as the product of an endothermal chemical reaction, enters the annular chamber 35 via the ports 49 and is discharged via vent 36 either as a reaction product or as hot gas for industrial use, e.g. for operating electric power generating turbines.

It should be noted that the geometry of the injection and discharge of the pressurized working fluid can be modified to meet specific design requirements.

In the course of operation the reflector 15 is cooled by cooling water ingressing via pipe 21 and egressing via sleeve 23.

In the course of operation air is injected continuously via ducts 44 sweeping the outer surface of window 6 whereby it is cooled and any dust deposited thereon is removed. The sweeping air is discharged via bores 26, duct 28 and bores 27.

Thus, the window is cooled from the inside by the working gas injected through nozzle 42, and from the outside by the air from duct 44.

Due to the frusto-conical shape of the tubular window 6, the pressure acting thereon from within has components which are parallel to the surface of the window and which accordingly result in a compression. Accordingly, this window is well suited to withstand the elevated pressure prevailing within the central solar receiver according to the invention in consequence of the injection of pressurized working fluid through inlets 38' and 38".

In the course of operation any thermal expansion whether symmetric or asymmetric, is absorbed by bellows 19 and as a result, any cracking of the window or other components of the receiver is avoided.

It will be readily understood by those skilled in the art that the frusto-conical shape of the volumetric solar absorber 30 is not critical and that instead, any other axi-symmetric configuration may be used such as, for example cylindrical, paraboidal, ellipsoidal and the like. It will be further appreciated that the spike-like configuration of the absorber members 32 shown herein is not critical and any other suitable configuration may also be used such as, for example rods, hollow cylindrical tubes, frustum, flat panels and the like.

An experimental model of the receiver herein described was tested at a power level of about 10 kW. The receiver pressure during the tests was between 15 and 25 atmospheres; the maximum absorber temperature was about 1100° C.; the total exposure time was about 50 hours. None of the receiver's components was damaged or failed during the tests.

We claim:

1. A central solar receiver comprising:
   a tubular housing having an opening and a window for the admission of incident concentrated solar radiation;
   a volumetric solar absorber within the housing and comprising a base body, an array of absorber members held by the base body and spaced from each other, the absorber members projecting from one face of said volumetric solar absorber with free ends of the absorber members facing said window;
   injection means for injecting a working fluid into the volumetric solar absorber in flow directions intersecting the absorber members and withdrawing means for withdrawing heated working fluid, wherein:
   said volumetric solar absorber is formed as an axi-symmetric, frusto-conical, tubular body coaxial with said tubular housing and having a radiation admitting aperture underlying said opening of the housing, said absorber members projecting towards a longitudinal axis of said volumetric absorber;
   said window is formed as an axi-symmetric, frusto-conical, tubular body coaxial with and surrounded by said volumetric solar absorber; and
   a rear of said window is connected to said housing by a bellows, the bellows absorbing thermal expansion of said window;
   wherein the central solar receiver is adapted to operate under an elevated pressure of the working fluid.

2. The central solar receiver according to claim 1, wherein said window has a double pane.

3. The central solar receiver according to claim 1, further comprising means for sweeping the inner face of said window with pressurized working fluid from inside the receiver to cool the window.

4. The central solar receiver according to claim 1, further comprising means for sweeping the outer face of said window with ambient air, wherein the window is cleaned and cooled.

* * * * *